UNITED STATES PATENT OFFICE.

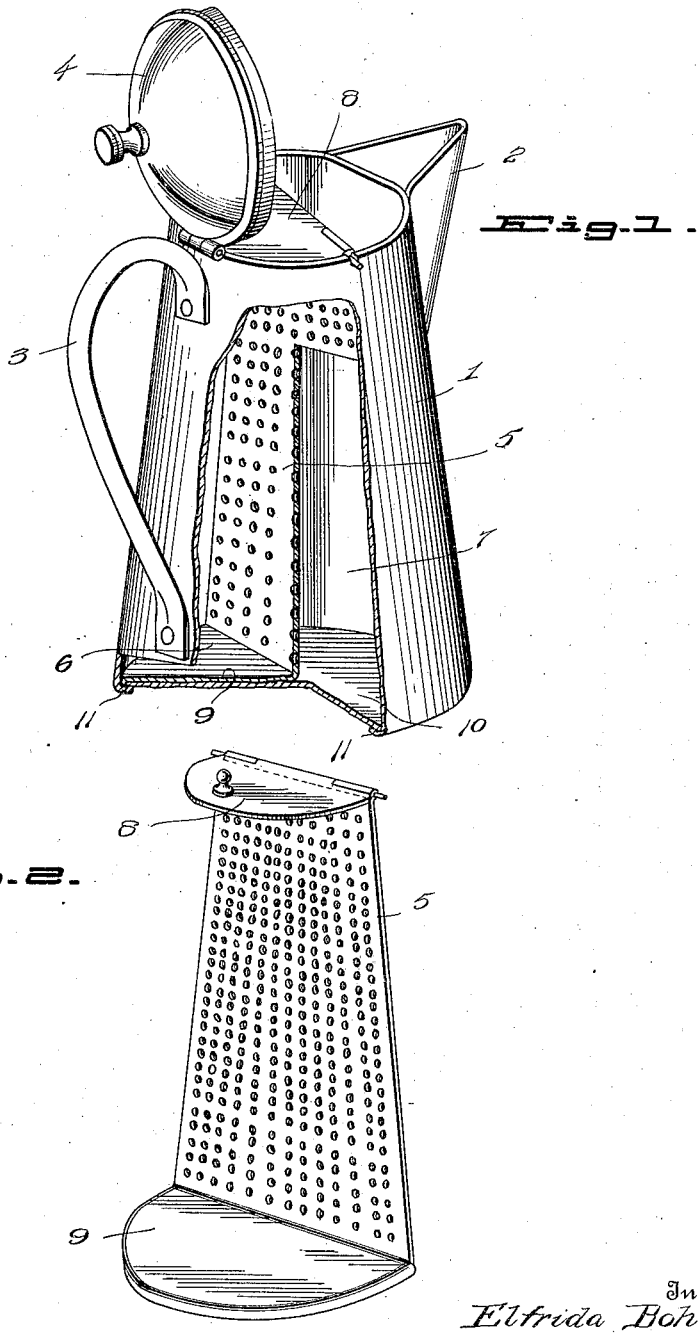

ELFRIDA BOHMAN, OF ROCK ISLAND, ILLINOIS.

COFFEE OR TEA POT.

1,079,830.  Specification of Letters Patent.  Patented Nov. 25, 1913.

Application filed January 8, 1913. Serial No. 740,851.

*To all whom it may concern:*

Be it known that I, ELFRIDA BOHMAN, a citizen of the United States, residing at Rock Island, in the county of Rock Island and State of Illinois, have invented new and useful Improvements in Coffee or Tea Pots, of which the following is a specification.

This invention relates to coffee or tea pots, and particularly to a pot of this character having a perforated partition forming compartments for the reception, respectively, of the coffee or tea and the water so that the water will come in contact with and dissolve the soluble constituents of the coffee or tea for the production of the desired beverage, which may be poured off in a clear condition, while the grounds or leaves are retained.

The object of the invention is to provide a coffee or tea pot having a partition of the character described, together with a lid or cover for closing the tea or coffee compartment, and which partition is provided with an attaching portion adapted to be secured to the bottom of the pot, thus forming a double bottom to prevent the coffee or tea from being burned.

The invention consists of the features of construction, combination and arrangement of parts hereinafter fully described and claimed, reference being had to the accompanying drawings, in which:—

Figure 1 is a sectional perspective view of a coffee or tea pot embodying my invention. Fig. 2 is a perspective view of the partition removed.

Referring to the drawing, 1 designates the body of a coffee or tea pot of any preferred form, and which is provided with the usual pouring spout 2, handle 3 and lid or cover 4. It will, of course, be understood that the body of the pot may be made of any suitable material.

Disposed centrally and vertically within the body of the pot is a partition 5 formed of perforated sheet metal or other suitable material and having its edges suitably united with the walls of the pot to provide compartments 6 and 7 which are in communication only through the perforations in the partition. The compartment 6 is arranged at the side of the pot adjacent the handle and is designed to receive the coffee or tea, while the compartment 7 is arranged at the side of the pot provided with the spout 2 and is designed to receive the water.

As shown, the partition 5 is provided at its upper end with a lid or cover 8 hinged thereto, whereby the compartment 6 may be closed to prevent the grounds or leaves from escaping when the pot is tilted for the discharge of the beverage.

Rigidly fixed to the lower edge of the partition is a semi-circular base piece 9, which covers that portion of the bottom 10 of the pot which forms the base of the compartment 6. The said base piece 9 provides in conjunction with the bottom 10 a double bottom for the compartment 6 to obviate liability of the coffee grounds or tea leaves being burned or otherwise injured by the action of heat, and may be riveted or otherwise secured to the bottom 10. As shown in the present instance, the base piece 9 has its edge turned in to interlock with the seam 11 whereby the body of the pot is joined to the bottom 10, this firmly fastening the elements together.

In practice it will be understood that the coffee or tea is placed in the compartment 6 and the water in the compartment 7, and that the water passes through the perforations in the partition 5 and leaches out the coffee or tea, producing a beverage of the character and strength desired. This beverage is adapted to be drawn from the compartment 7 through the spout 2 in a clear condition, as the coffee grounds or tea leaves are retained by the screen partition within the compartment 6. The body and partition may be made of aluminum or any other suitable material.

I claim:—

1. A coffee or tea pot having a pouring spout, a perforated vertical partition arranged within the body of the pot and subdividing the same to form compartments, one of which is in communication with the spout and a base piece integral with the bottom of said partition and forming the base of the other compartment, said base being in locked engagement with the body of the pot.

2. A coffee or tea pot having a pouring spout, a partition disposed vertically within said pot and forming compartments, one communicating with said spout, a lid or cover hinged to the upper edge of the partition for closing one of said compartments and a partially circular base piece projecting laterally from the lower edge of the partition and covering the underlying portion of the bottom of the pot, the wall, bottom of the pot and base piece of the partition being jointly united.

3. A coffee or tea pot comprising a body having a pouring spout, a bottom united to the body, a vertical perforated partition within the pot and subdividing the same into compartments one of which is in communication with the spout, and an integral semi-base piece at the lower end of the partition resting upon the bottom of the pot and united therewith to the body of the pot.

In testimony whereof I affix my signature in presence of two witnesses.

ELFRIDA BOHMAN.

Witnesses:
RICHARD MAXWELL,
GEO. W. GAMBLE.

Copies of this patent may be obtained for five cents each, by addressing the "Commissioner of Patents, Washington, D. C."